United States Patent
Chu et al.

(10) Patent No.: US 7,120,787 B2
(45) Date of Patent: *Oct. 10, 2006

(54) SECURE SWITCHING FOR DOWNLOADING NETWORK BOOTS

(75) Inventors: Simon C. Chu, Chapel Hill, NC (US);
Richard A. Dayan, Raleigh, NC (US);
Gregory B. Pruett, Raleigh, NC (US);
David B. Rhoades, Raleigh, NC (US)

(73) Assignee: International Business Machinces Corporation, Armonk, NY (US)

( * ) Notice: Subject to any disclaimer, the term of this patent is extended or adjusted under 35 U.S.C. 154(b) by 446 days.

This patent is subject to a terminal disclaimer.

(21) Appl. No.: 10/698,208

(22) Filed: Oct. 31, 2003

(65) Prior Publication Data

US 2005/0097360 A1    May 5, 2005

(51) Int. Cl.
*G06F 15/177* (2006.01)
*G06F 9/24* (2006.01)
*G06F 9/00* (2006.01)

(52) U.S. Cl. .................................. 713/1; 713/2; 713/100
(58) Field of Classification Search ................ 713/1, 713/2, 100
See application file for complete search history.

(56) References Cited

U.S. PATENT DOCUMENTS

| | | | |
|---|---|---|---|
| 6,314,520 B1 * | 11/2001 | Schell et al. | .................. 726/13 |
| 2003/0126426 A1 * | 7/2003 | Frye, Jr. | ........................ 713/2 |
| 2004/0081104 A1 * | 4/2004 | Pan et al. | ................... 370/254 |

* cited by examiner

*Primary Examiner*—Lynne H. Browne
*Assistant Examiner*—Stefan Stoynov
(74) *Attorney, Agent, or Firm*—Cynthia S. Byrd; Dillon & Yudell LLP

(57) ABSTRACT

A method and system for managing a secure network boot of a secondary server (server blade). The server blade sends a request, via an Ethernet switch, for a boot program to multiple Dynamic Host Configuration Protocol (DHCP) servers. One of the DHCP servers responds with an address of at least one Pre-boot Execution Environment (PXE) server that can upload a boot program to the server blade. Only if the responding DHCP server is on a list of known trusted DHCP servers will the Ethernet switch allow the server blade to receive the response from the responding DHCP server, thus allowing the download of a boot program from a PXE server.

6 Claims, 5 Drawing Sheets

SECURE SWITCHING FOR DOWNLOADING NETWORK BOOTS

BACKGROUND OF THE INVENTION

1. Technical Field

The present invention relates in general to the field of computers, and in particular to multiple blade servers housed in a server chassis. Still more particularly, the present invention relates to a method and system for filtering, through an Ethernet switch, responses from Dynamic Host Configuration Protocol (DHCP) servers to a blade server's network boot request, such that responses to the network boot request are only accepted from trusted DHCP servers.

2. Description of the Related Art

Server blade computers offer high-density server boards (blades) in a single chassis (blade chassis). Server blades are servers that often are under at least partial control of a primary server, having a relationship similar to that of a server/client. Thus, as shown in FIG. 1, a blade chassis 102, having multiple server blades 103, is connected to a network 106, which also connects to multiple clients 104.

One of the server blades 103 may utilize a network boot protocol known as Pre-boot Execution Environment (PXE). PXE allows server blade 103 to request an Internet Protocol (IP) address from the DHCP server 108, and to obtain the IP address of a PXE boot program server, from PXE boot server network 110, that can provide a boot image that can be used to load a new operating system (OS), flash a Basic Input/Output System (BIOS) memory, or even erase data on a local hard disk. Management server network 108, typically comprised of Dynamic Host Configuration Protocol (DHCP) servers, and PXE boot server network 110, are connected to blade chassis 102 via network 106.

To download a boot program, server blade 103 broadcasts a request to network 108. One or more of the DHCP servers in network 108 respond back to server blade 103 with a dynamic IP address along with lease information and a list of PXE Boot S servers from network 110 that can download a boot program to server blade 103. If responses from multiple DHCP servers from network 108 are put on network 106, then server blade 103 typically responds to the first request response to arrive a server blade 103.

A network boot of server blade 103 as described is not secure, since the broadcasted boot request can result in a response from any DHCP or PXE server connected to network 106, including an unauthorized DHCP server attempting to tamper with the network. For example, an unauthorized DHCP server could direct server blade 103 to an unauthorized PXE boot server, which could result in possible undesired operation such as exposures to operational security and/or destroying data on a local fixed disk drive. What is needed, therefore, is a method and system for preventing booting from unauthorized DHCP/PXE servers.

SUMMARY OF THE INVENTION

The present invention is directed to a method and system for managing a secure network boot of a server blade. The server blade is part of a server blade chassis, which holds multiple server blades that communicate with outside devices via an Ethernet switch, which is under the control of a management module in the server blade chassis. The management module oversees communication between server blades and networks of multiple Dynamic Host Configuration Protocol (DHCP) servers and Pre-boot Execution Environment (PXE) boot program servers. When a server blade receives a response from a DHCP server directing the server blade to a PXE boot program server, the Ethernet switch compares the identity of the responding DHCP server with a list of trusted DHCP servers. Only if the responding DHCP server is on the list of trusted DHCP servers and the PXE Boot Server information it provides is on the list of trusted PXE Boot Servers will the Ethernet switch allow the server blade to access and download a boot program from a PXE server suggested by the DHCP server.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF A PREFERRED EMBODIMENT

Figure 1:
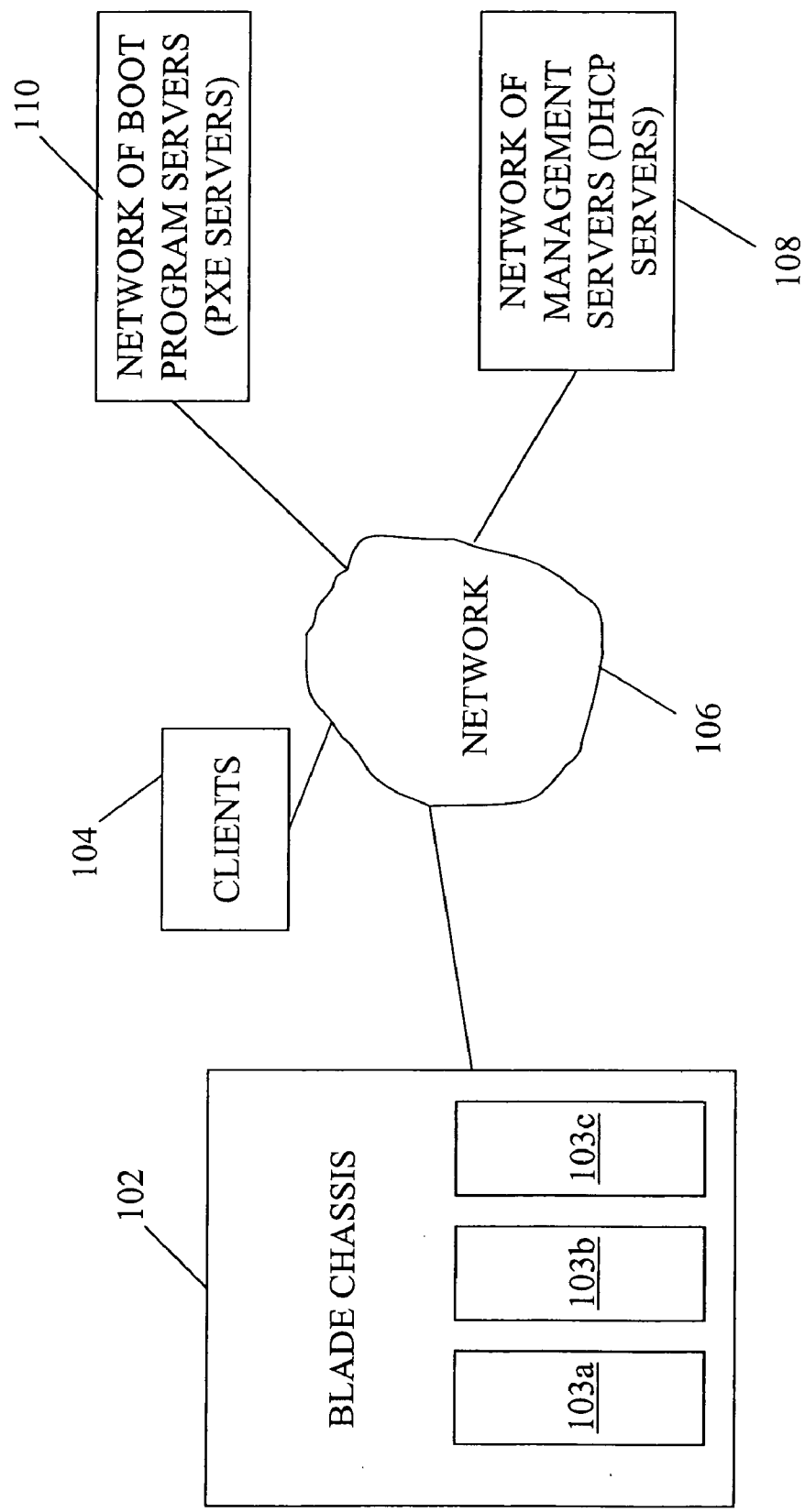
FIG. 1 depicts a prior art diagram of a network connecting a server blade computer (blade chassis) with primary servers.
Figure 2:
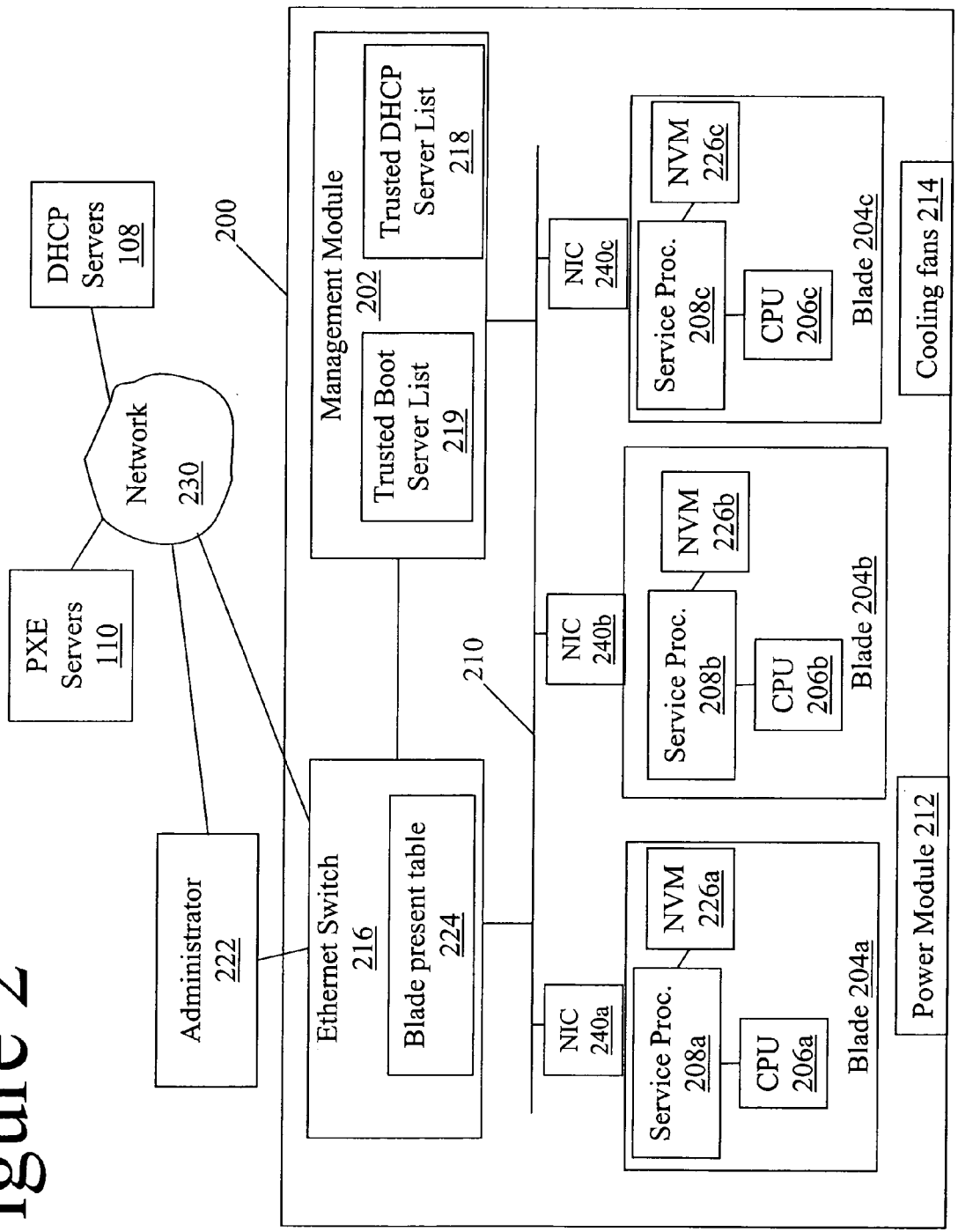
FIG. 2 illustrates a blade chassis incorporating a trusted DHCP server list and a trusted PXE Boot Server list in a management module in the blade chassis.

With reference now to FIG. 2, there is depicted a schematic block diagram of a server blade chassis 200 according to a preferred embodiment of the present invention. For the sake of clarity, only one management module 202 and three server blades 204 are depicted. However, in a preferred embodiment, a backup management module 202 is incorporated into server blade chassis 200, and server blade chassis 200 has a midplane capable of connecting several server blades 204.

Management module 202 is coupled to server blades 204a–c via a midplane 210, which contains at least one serial bus for secure internal communication between management module 202 and server blades 204a–c, as well as between server blades 204a–c themselves, via respective service processors 208a–c. Management module 202 also communicates with an Ethernet switch via an internal secure serial bus 216 to control communication between DHCP/PXE Boot servers and server blades 204 as described below.

Management module 202 has the capability of sending alerts to administrator server 222 to indicate changes in server blade chassis 200's status, such as a removal or addition of a blade 204. Management module 202 can detect the presence, quantity, type and revision level of each server blade 204, power module 212, cooling fans 214, and midplane 210 in the system, and can detect invalid or unsupported configurations. If a problem is detected in any part of the system, management module 204 can transmit a warning to administrator server 222 via Ethernet switch 216.

Each server blade 204 has at least one central processing unit (CPU) 206, and a non-volatile memory (NVM) 226. Each server blade 204 communicates with an external network 230 via a Network Interface Card (NIC) 240 and an Ethernet switch 216. For the purpose of clarity, only one Ethernet switch 216 is shown, although in a preferred embodiment server blade chassis 200 has at least two Ethernet switches 216, whose communication with each server blade 204 is coordinated by a management module 202 which consults a blade present table 224 associated with each Ethernet switch 216.

Management module 202 manages and coordinates communication between server blades 204 and network 230 via Ethernet switch 216 and administrator server 222. In a preferred embodiment, communication is directly between Ethernet switch 216 and network 230. As described in detail in FIG. 3, management module 202 also maintains a trusted DHCP server list 218 and a trusted Boot server list 219.

Figure 3A:
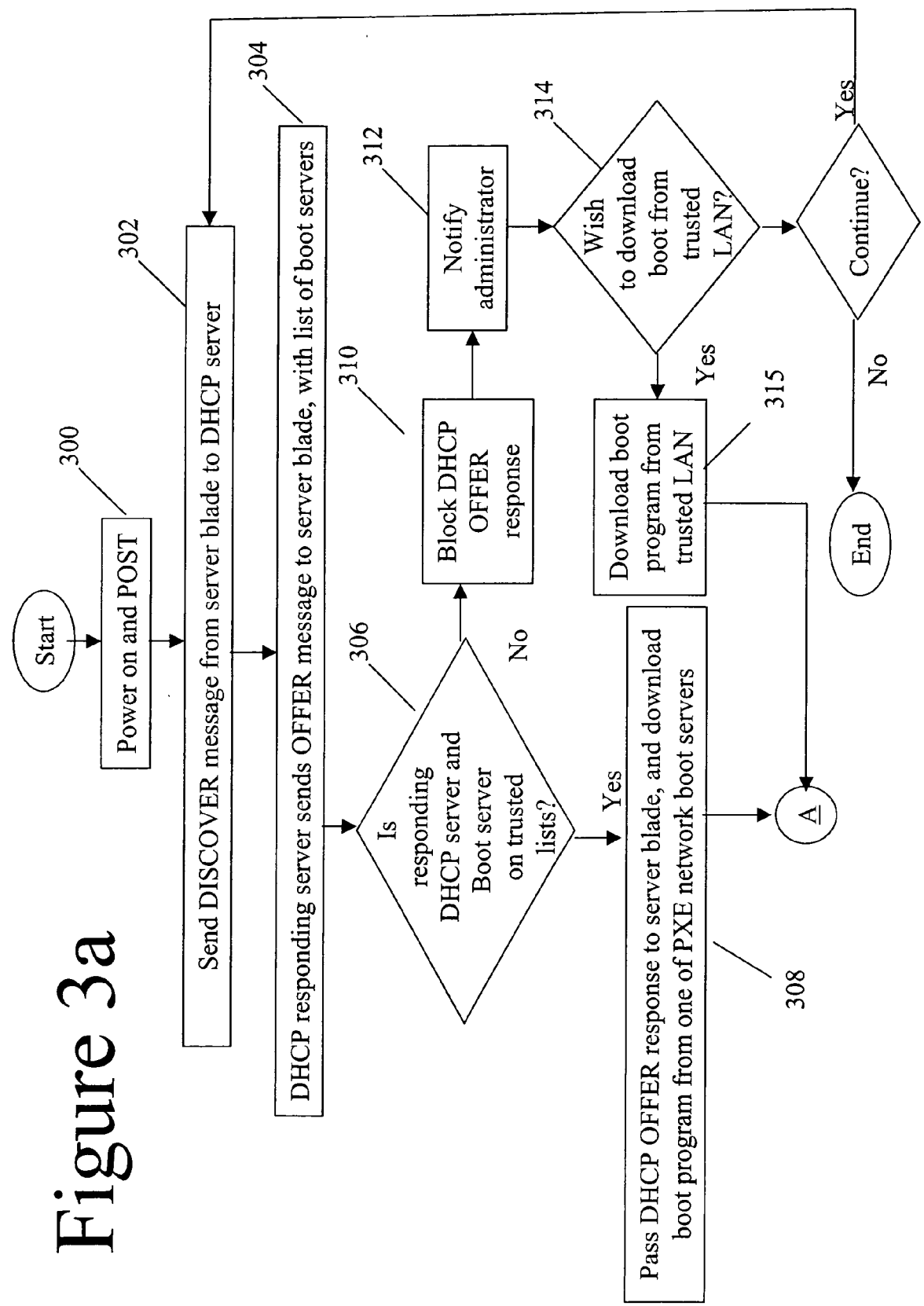
FIGS. 3a–b depict a flow-chart of the present invention's method for a server blade to acquire a boot program and Internet Protocol (IP) address from trusted Dynamic Host Configuration Protocol (DHCP) servers.
Figure 3B:
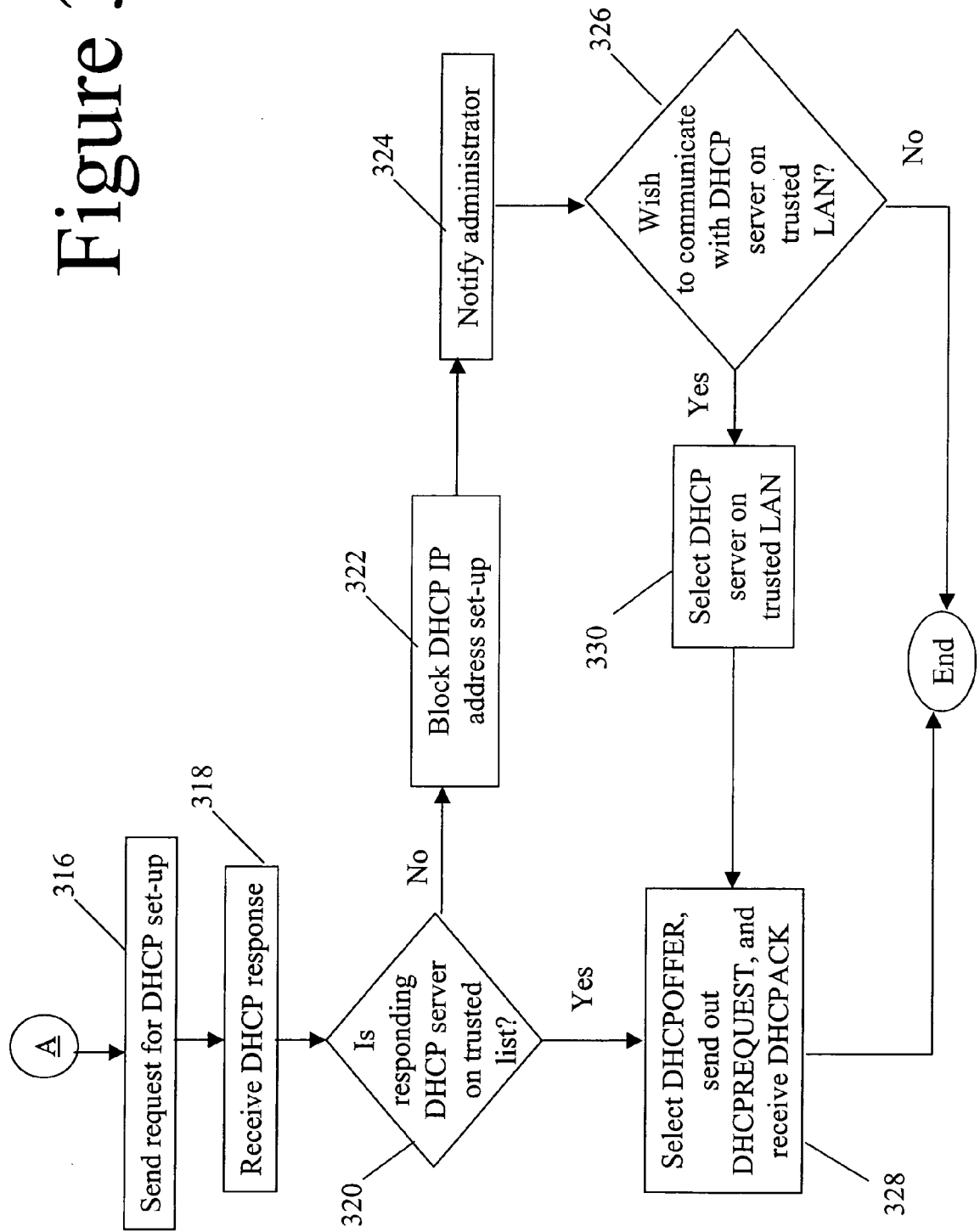

With reference now to FIG. 3, there is depicted a flowchart of a preferred embodiment of the present invention's method for securely obtaining a network boot program for a server blade. As shown at block 300, the server blade is powered up and a power on self-test (POST) program is run, performing basic system testing. To initiate the process of a network boot (as opposed to booting from a local device such as a hardfile), the server blade sends a DHCP DISCOVER request to a network of DHCP servers (block 302), which are preferably DHCP servers (management servers) capable of returning to the server blade a Dynamic IP address and the IP address of a PXE Boot Server that is capable of downloading a boot program to the server blade. One or more DHCP servers respond with DHCP OFFER messages back to the Ethernet switch used by the requesting server blade (block 304). The DHCP OFFER messages contain the IP addresses of the responding DHCP servers, a Dynamic IP address with lease information (preferably as defined by the Internet Engineering Task Force Request For Comments 1534, 2131, and 2132), plus a list of PXE Boot Servers that the server blade can contact to download a boot program.

When the Ethernet Switch receives the selected DHCP OFFER message from the responding DHCP server, a determination is made as to whether the responding DHCP server is trustworthy and whether the boot server to which the offer refers is trustworthy (block 306). This determination is accomplished by Ethernet Switch 216 filtering the responses by looking for DHCP OFFERs that are contained within the list of trusted boot servers 219 list programmed into the Ethernet Switch. In a preferred embodiment, this comparison is made by evaluating the responding DHCP server's packets at Layer 3 of the Open Systems Interconnection (OSI) model. As known to those skilled in the art, upper OSI layers 7 through 4 support Application, Presentation, Session and Transport respectively, while lower OSI layers 2 and 1 support Data Link and Physical levels respectively. OSI layer 3 is the Network layer, which provides switching and routing criteria, including the establishment and use of IP addresses. In a preferred embodiment of the present invention, the Ethernet switch, under the control of the management module, performs Layer 3 packet filtering by comparing the IP address of the responding DHCP server with those IP addresses listed in the list of trusted DHCP servers. Preferably, this list is maintained in the management module, or alternately in the Ethernet switch.

If the responding DHCP server is on the list of trusted servers, then the DHCP OFFER message from the responding DHCP server is allowed to pass to the requesting server blade, which selects one of the PXE servers from the listing in the DHCP OFFER message, and sends a request to a selected PXE server for a boot program (block 308), which is then downloaded into the server blade.

If the responding DHCP server is NOT on the list of trusted servers, then the management module blocks the OFFER message from passing through the Ethernet switch to the server blade that made the request (block 310). The network and/or system administrator is notified (block 312) of the presence of an unauthorized DHCP server on the network. Preferably, this message is sent as a Simple Network Management Protocol (SNMP) trap or alert and to the management module, which can forward the alert to additional consoles on a management module network (not shown).

A query (block 314) is then made to determine if the server blade should download a boot program from a trusted PXE server on a secure local area network (LAN). If so, then such a download is performed (block 315); if not, then the process continues (block 313) until a trusted DHCP response is received, resulting in the server blade continuing in a network boot. Otherwise, the process ends, resulting in the server blade booting from another non-network local device or means (not shown).

After the server blade has booted up, a second request is sent out to the network requesting a DHCP set-up (block 316). A DHCP set-up provides configuration parameters to the server blades. DHCP is an extension of BOOTP, an IP allocation specification. DHCP supports the concept of a "lease" of an IP address, in which a DHCP server allocates an IP address to the server blade for a pre-determined period of time. The server blade broadcasts a DHCPDISCOVER packet to the network of DHCP servers. DHCP servers on the network see the broadcast and return a DHCPOFFER packet that contains an offered IP address for the blade server and other information (block 318). The DHCP servers conduct preliminary testing before offering the addresses, such as determining if the offered IP address is already in use by another node on the network. Typically, the server blade chassis (via the Ethernet switch) will receive multiple DHCPOFFER packets from different DHCP servers.

The Ethernet Switch 216 then compares the IP address of the responding DHCP server, found in the DHCPOFFER packet, with the list of trusted DHCP servers managed by the management module (block 320). If the DHCPOFFER is from a valid DHCP server, the Ethernet switch 216 selects one of the DHCPOFFER packets based on some predetermined criteria, such as which packet was received first, which packet offers the longest lease, or which DHCP server provides the most information that the specific server blade needs for optimal operation, and passes the selected packet to the appropriate server blade. After selecting the preferred DHCP packet, the server blade sends out a DHCPREQUEST packet to the selected DHCP server. Assuming that the offer is still valid, the chosen DHCP server then returns a DHCPACK acknowledgment packet that tells the server blade that the lease is finalized (block 328), turning over ownership and maintenance of the lease to the server blade.

If the DHCPOFFER is from an unauthorized DHCP server, DHCP controlled IP address allocation and set-up is blocked (block 322) and the administrator is notified, via an SNMP trap or via the Management Module interface, of the presence of an unauthorized DHCP server on the network (block 324). A choice is then made (decision block 326) as to whether a DHCP controlled IP address set-up should be performed using a trusted DHCP server on a local secure LAN (block 330).

Figure 4:
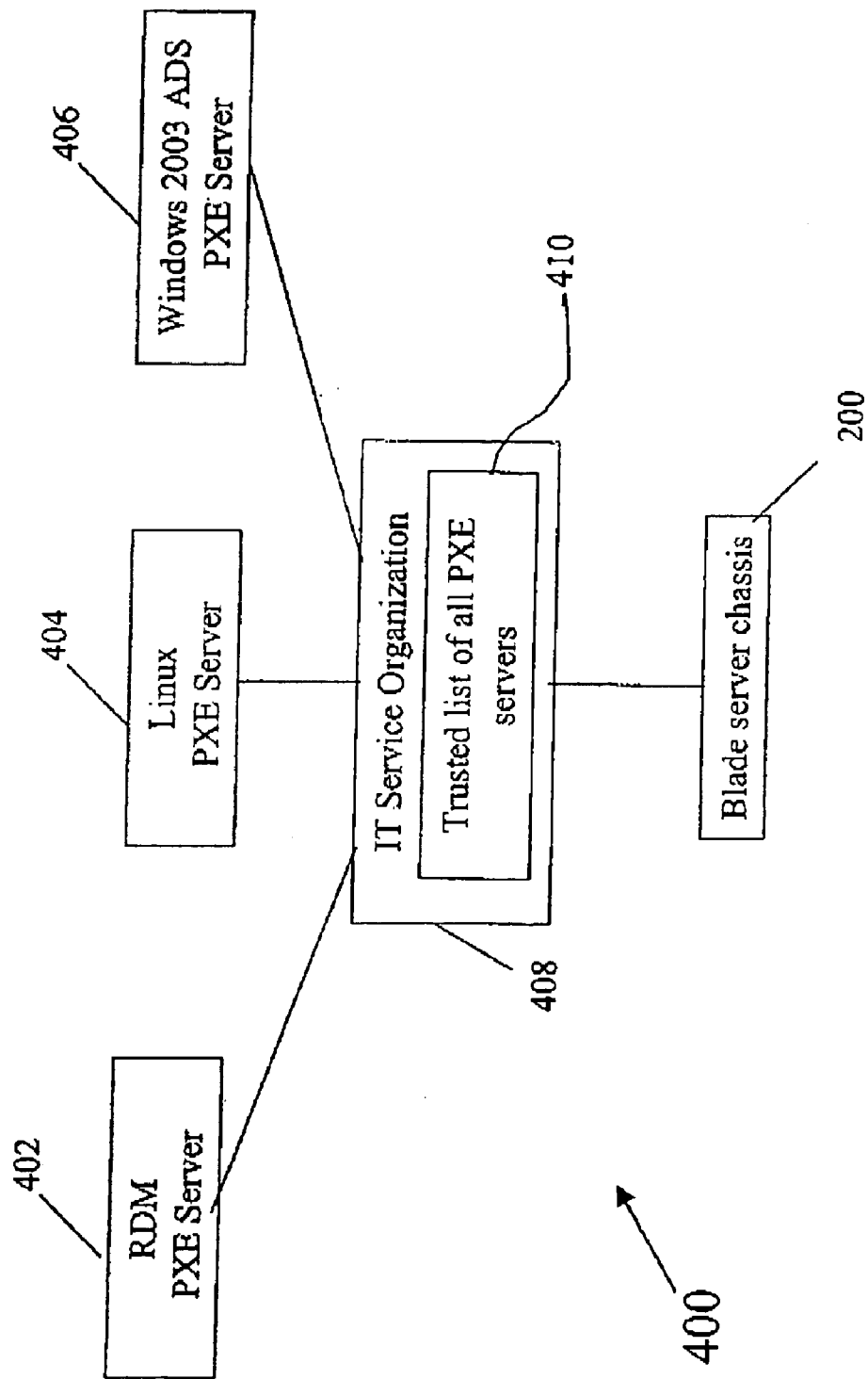
FIG. 4 illustrates a boot program network using different formats of Pre-boot Execution Environment (PXE) servers.

In another preferred embodiment, an information technology (IT) service organization is used to coordinate alternate types of PXE servers. Unlike DHCP, a limitation of the PXE protocol is that more than one PXE server in a network causes chaos due to the lack of ability in the PXE client to determine what server is the preferred server. Referring now to FIG. 4, there is illustrated a block diagram of a PXE network 400 having an IT service organization, such as IBM's Global Services (IGS) that manages various deployment server types, such as Remote Deployment Manager (RDM) PXE server 402, Linux® PXE server 404, and Windows® 2000 Remote Installation Services (RIS) PXE server 406 for contracted accounts. The IT service organization 408 assigned systems administrator maintains a list 410 of trusted PXE boot program servers, which allows the same IT service organization 408 assigned systems administrator to manage the various deployment server types, maintain the permission lists for each PXE boot program server type, monitor the network for unauthorized DHCP/PXE servers, and shut down network ports of the unauthorized DHCP/PXE servers. Use of the aforementioned embodiments allow the IT service organization 408 to manage various PXE servers and to have them coexist in the same network, and thus reducing supports costs created by the consolidation of network and support organizations, since the permission list for each chassis can control where each blade chassis obtains its boot image.

It should be noted that this invention is possible due to the tight integration of the Management Module, Ethernet Network Switch, and the actual server blades within the server blade chassis. Because of this tight integration, this invention does not require any code changes to the blade firmware, so the invention is agnostic to the vendor of BIOS on the blade.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A service for managing a secure network boot of a server blade, the server blade being in a blade chassis that has multiple server blades, the blade chassis including a switching means allowing the server blade to communicate with a network, the service comprising:

storing a list of trusted Dynamic Host Configuration Protocol (DHCP) servers in a management module on a server blade;

broadcasting a DHCP DISCOVER request to a network of DHCP servers;

receiving, at a switching means associated with the server blade, a DHCP OFFER message that is responsive to the DHCP DISCOVER request, wherein the DHCP OFFER message contains Internet Protocol (IP) addresses of responding DHCP servers, a Dynamic IP address with lease information, and a list of Pre-boot eXecution Environment (PXE) Boot Servers that can be contacted by the server blade to download a boot program, and wherein the DHCP OFFER comes from a responding DHCP server on the network of DHCP servers;

comparing an identity of the responding DHCP server with the list of trusted DHCP server in the management module on the server blade;

in response to verifying that the responding DHCP server is on the list of trusted DHCP servers, permitting the DHCP OFFER message to pass through to the server blade via an Ethernet switch that is coupled to the server blade, and downloading a boot program from a boot program server specified by the responding DHCP server;

in response to determining that the responding DHCP server is not on the list of trusted DHCP servers, blocking the transmittal of the response from the responding DHCP server through the Ethernet switch to the server blade; and in response to determining that the responding DHCP server is not on the list of trusted DHCP servers, generating an alert to a designated administrator server of a presence of an unauthorized DHCP server on the network of DHCP servers.

2. The service of claim 1, further comprising:

coordinating different types of boot program servers available to the server blade by maintaining, in an information technology services organization logically oriented between the different types of boot program servers and the server blade, a permission list of boot program servers authorized for each server blade in a server blade chassis.

3. The service of claim 2, wherein the information technology services organization is an Information Technology (IT) services organization that manages various types of Pre-boot eXecution Environment (PXE) deployment servers; and wherein the IT services organization enables a same IT service organization assigned systems administrator to manage the various types of PXE deployment servers, to maintain permission lists for each PXE server type, to monitor a network for a presence of unauthorized PXE servers that are not authorized, by the IT services organization, to support the client computer, and to shut don network ports, for unauthorized PXE servers, in the client computer.

4. The service of claim 1, wherein the alert to the designated administrator server is made using a Simple Network Management Protocol (SNMP) trap sent by the server blade.

5. The service of claim 1, wherein none of the steps described in claim 1 causes any code changes to firmware in the server blade.

6. The service of claim 1, further comprising:

in response to the responding DHCP server not being on the list of trusted DHCP servers, downloading a boot program from a trusted PXE server on a secure Local Area Network (LAN).

* * * * *